Patented Mar. 9, 1954

2,671,798

UNITED STATES PATENT OFFICE 2,671,798

2,2-DIPHENYL-3-METHYL-4-CHLORO-BUTYRONITRILE AND PROCESSES FOR PREPARING THE SAME

Earl M. Chamberlin and Max Tishler, Westfield, N. J., assignors to Merck & Co., Inc., Rahway, N. J., a corporation of New Jersey No Drawing. Original application April 9, 1949, Serial No. 86,596. Divided and this application July 25, 1951, Serial No. 238,576

6 Claims. (Cl. 260—465)

This invention relates o the manufacture of compounds possessing analgesic and anesthetic action. In particular, it is concerned with an improved synthetic method for preparing 2,2-diphenyl-3-methyl-4-dimethylamino-butyronitrile and with novel chemical compounds useful as intermediates in the preparation of this compound. 2,2-diphenyl-3-methyl-4-dimethylamino-butyronitrile is itself an important intermediate in the synthesis of isoamidone, 1-dimethylamino-2-methyl-3,3-diphenyl-hexanone-4 and salts thereof. Isoamidone and its salts possess analgesic action and may be used as substitutes for morphine.

This application is a division of our co-pending application Serial No. 86,596, filed April 9, 1949, now Patent No. 2,607,794.

2,2-diphenyl-3-methyl-4-dimethylamino-butyronitrile has been prepared previously by reacting 1-dimethylamino-2-chloropropane with diphenylacetonitrile as described by Schultz et al. (J. A. C. S. 69, 188–189, Jan. 1947). As pointed out by these workers, however, when 2,2-diphenyl-3-methyl-4-dimethylamino-butyronitrile is prepared by this procedure, there is obtained, at the same time and mixed with this compound, the isomeric nitrile 2,2-diphenyl-4-methyl-4-dimethylamino-butyronitrile. The latter nitrile isomer constitutes an unwanted by-product since it cannot be converted to isoamidone.

Moreover, the preparation of isoamidone directly from the mixture of isomeric nitriles has not proven feasible. In order to prepare isoamidone, it has therefore previously been necessary to isolate the desired 2,2-diphenyl-3-methyl-4-dimethylamino-butyronitrile from the mixture and this has necessitated a complicated separation procedure which results in a considerable loss of the desired isomer.

It is now discovered that the desired 2,2-diphenyl-3-methyl-4-dimethylamino-butyronitrile can be prepared by a novel process which does not produce any of the unwanted isomeric nitrile. This improved method thus eliminates the loss due to formation of the by-product isomer and at the same time avoids the need for a complicated separation procedure with its attendant losses of the desired isomer.

This novel process is conducted as follows: propylene chlorohydrin (compound 1 below) is reacted with an organic sulfonyl chloride (compound 2) to produce the corresponding 1-methyl-2-chloroethyl-sulfonate (compound 3). This compound is then treated with the reaction product of diphenyl acetonitrile and sodamide to produce 2,2-diphenyl-3-methyl-4-chlorobutyronitrile (compound 4) which is reacted with dimethylamine to form 2,2-diphenyl-3-methyl-4-dimethylamino-butyronitrile (compound 5). These reactions may be chemically represented as follows:

$$CH_3CHOHCH_2Cl + RSO_2Cl \longrightarrow CH_3CHCH_2Cl$$
$$\qquad\qquad\qquad\qquad\qquad\qquad\qquad |$$
$$\qquad\qquad\qquad\qquad\qquad\qquad\quad OSO_2R$$
$$\quad (1) \qquad\qquad (2) \qquad\qquad\qquad (3)$$

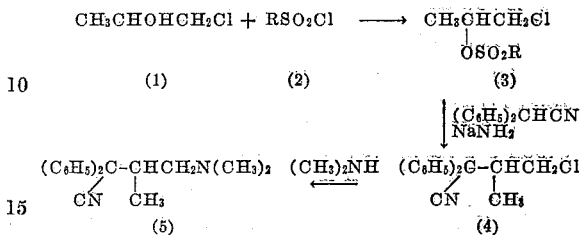

The organic sulfonyl chloride employed in the foregoing reaction can be either an aromatic sulfonyl chloride such as p-toluene sulfonyl chloride, benzene sulfonyl chloride and the like, or an aliphatic sulfonyl chloride such as methane sulfonyl chloride.

The reaction between propylene chlorohydrin and the aromatic sulfonyl chloride is ordinarily carried out in the presence of pyridine, preferably at a temperature of approximately 0° C. Under these conditions, the reaction is usually complete after a reaction period of 1 to 3 days. The pyridine hydrochloride, formed as a by-product of this reaction, ordinarily precipitates and is separated from the reaction mixture by filtration. The filtrate is then mixed with water and an organic water-immiscible solvent such as ether, chloroform, benzene, toluene, xylene and the like. The ether layer is separated and washed with an aqueous solution of a mineral acid such as hydrochloric acid, hydrobromic acid, sulfuric acid, and the like, and then with water. The ethereal solution is dried and evaporated to dryness under reduced pressure to produce, in the form of an oily residue, the corresponding 1-methyl-2-chloroethyl organic sulfonate, as for example 1-methyl-2-chloroethyl-p-toluenesulfonate, 1-methyl-2-chloroethyl-benzenesulfonate, 1-methyl-2-chloroethyl-methane-sulfonate, and the like.

This product is ordinarily purified by treatment with aqueous pyridine to convert the residual organic sulfonyl chloride to an acid. The resulting mixture is treated with an organic water-immiscible solvent and aqueous hydrochloric acid and the layers are separated. The organic solvent layer is washed first with an aqueous solution of a mineral acid and then with water; the organic layer is then further purified, if desired, by washing with an aqueous alkaline solution such as aqueous sodium hydroxide, aqueous potassium hydroxide, aqueous ammonium hydroxide, and the like, and again with water. The solvent layer is then dried and evaporated to dryness in vacuo to produce the desired 1-methyl-2-chloroethyl organic sulfonate as a clear light yellow oil which is ready for use in the reaction with diphenyl acetonitrile.

The above procedure can be varied by using a considerable excess of pyridine in the reaction between the organic sulfonyl chloride and propylene chlorohydrin. Under these conditions, there is an excess of pyridine present after the pyridine hydrochloride is removed by filtration. The addition of water at this point followed by a standing period results in complete hydrolysis of sulfonyl chloride. The step of purifying the first oily residue is eliminated since the 1-methyl-2-chloroethyl organic sulfonate formed at this stage is of satisfactory purity for employment in the subsequent reaction step.

The 1-methyl-2-chloroethyl organic sulfonate is treated with the reaction product of diphenylacetonitrile and sodamide. The diphenylacetonitrile is mixed with an equivalent molar quantity of sodamide and a liquid hydrocarbon, preferably a liquid having a boiling point of at least about 110° C., such as xylene, toluene, or liquid petrolatum. The resulting mixture is heated and stirred until at least about 95% of the theoretical amount of ammonia has been liberated, which ordinarily requires between about 3 and 5 hours. The reaction is ordinarily carried out at a temperature of about 105–110° C. under reflux and in the presence of a nitrogen atmosphere.

This reaction mixture is then cooled to between about 70 and 90° C. and the 1-methyl-2-chloroethyl organic sulfonate is added thereto rapidly, preferably keeping the temperature below about 90° C. The resulting mixture is then heated under reflux until the reaction is substantially complete, which ordinarily requires about 14 to 18 hours. The reaction mixture is then mixed with water, and the organic layer is separated, washed with water and dried. The organic layer is evaporated to dryness to produce a crude product which may be used, if desired, in the subsequent reaction with dimethylamine. The crude product can be purified by distillation in vacuo to produce substantially pure 2,2 - diphenyl - 3 - methyl-4-chloro-butyronitrile (compound 4).

As pointed out above, the nitrile product prepared in this way consists only of the desired 2,2 - diphenyl - 3 - methyl-4-chloro-butyronitrile uncontaminated with any isomeric product. This is clearly important in view of the fact that when diphenyl acetonitrile is reacted with 1-dimethylamino-2-chloropropane (as described in the Schultz article referred to on page 2) the product contains both 2,2-diphenyl-3-methyl-4-dimethylaminobutyronitrile and 2,2-diphenyl-4-dimethylaminovaleronitrile.

An extremely important and unexpected feature of this sodamide condensation is that the reaction proceeds preferentially with the elimination of the organic sulfonyl group attached to the middle carbon atom of the propane moiety, thus producing the desired 2,2-diphenyl-3-methyl - 4 - chloro - butyronitrile. Inasmuch as alkyl halides are known to alkylate readily under the same conditions, it might have been expected that the reaction would have taken place with the elimination of the chlorine atom attached to the end carbon atom of the propane moiety thus forming the unwanted 2,2-diphenyl-4-(organic-sulfonyl)-valeronitrile. The formation of this compound, in other than small amounts, would make the reaction impractical.

The 2,2-diphenyl-3-methyl-4-chloro - butyronitrile is then reacted with substantially anhydrous dimethylamine. Small amounts of water are not harmful, but larger amounts result in a heterogeneous mixture of reactants. It is therefore preferred to conduct the reaction under substantially anhydrous conditions. It is ordinarily desired to employ an excess of dimethylamine in the reaction. Since dimethylamine is a gas at room temperature, it is convenient to mix the reactants together at a temperature below about 7° C. The mixture of reactants is then heated in a pressure vessel to a temperature of approximately 100–150° C. Under these conditions, the reaction is ordinarily complete in approximately 48 hours.

If desired, the reaction can be carried out in the presence of a solvent for the reactants, such as ethyl alcohol, and at a temperature of about 100–150° C. It has been found, however, that the presence of an organic solvent, such as ethanol, tends to lower the yield. It is ordinarily preferred, therefore, to carry out the reaction utilizing dimethylamine and 2,2-diphenyl-3-methyl-4-chloro-butyronitrile as the sole components, and to conduct the reaction at the higher temperature of 150° C. employing the longer reaction period (48 hours), since these conditions have been found to result in the obtainment of a higher yield than that obtainable when the reaction is carried out in the presence of a solvent.

A mixture of water and an organic water-immiscible solvent such as ether, chloroform, benzene, toluene, xylene, and the like, is then added to the reaction mixture and the organic solvent layer is extracted with an aqueous solution of a mineral acid such as hydrobromic acid, sulfuric acid, and the like. The aqueous acid extracts are then neutralized with an inorganic base such as sodium hydroxide, potassium hydroxide, ammonium hydroxide and the like, and the aqueous alkaline solution extracted with an organic water-immiscible solvent. The organic solvent extracts are combined and evaporated to dryness in vacuo to produce crude 2,2-diphenyl-3-methyl-4-dimethylamino-butyronitrile. Since this material is obtained by reaction of dimethylamine with the single isomer, 2,2-diphenyl-3-methyl - 4 - chloro - butyronitrile, this product is likewise uncontaminated with any isomeric nitrile material. The crude 2,2-diphenyl-3-methyl-4-dimethylamino-butyronitrile can be used, without further treatment, for the production of isoamidone. It may be purified as follows: The crude material is dissolved in ether or other organic solvent, the ether solution is saturated with dry hydrogen chloride gas, and the amine hydrochloride, which precipitates, is recovered by filtration and recrystallized from absolute ethanol to produce substantially pure 2,2-diphenyl-3-methyl-4-dimethylamino-butyronitrile hydrochloride.

The following examples illustrate methods of carrying out the present invention, but it is to be understood that these examples are given by way of illustration and not of limitation.

*Example 1*

In 79 gms. of pyridine were suspended 190.6 gms. of p-toluene sulfonyl chloride, and the mixture was cooled to 0° C. To this suspension, 95.6 gms. of propylene chlorohydrin were added slowly, with stirring, keeping the temperature at 0° C. Stirring at 0° C., was continued for 3 hours. The reaction mixture was allowed to stand in an icebox for 24 hours, and was then stirred at room temperature for about 40 hours.

Pyridine hydrochloride, which had precipitated, was removed by filtration; and the filtrate was diluted with ether and water. The two layers were separated, and the ethereal layer was washed successively with 2.5 N hydrochloric acid and water. The ethereal solution was dried and concentrated to dryness in vacuo.

To the oily residue, 79 gms. of pyridine and 10 cc. of water were added; and the solution was allowed to stand 1 hour, to convert residual p-toluene sulfonyl chloride to the acid. Ether and hydrochloric acid were added, and the layers were separated. The ethereal layer was washed successively with hydrochloric acid and water. The ethereal solution was dried and concentrated to dryness in vacuo. There was obtained a residue of 203.1 gms. (81.3%) of 1-methyl-2-chloroethyl-p-toluene sulfonate which was obtained in the form of a clear, light-yellow oil.

A portion of this oil was distilled; it boiled at 106–118° C./0.1–0.25 mm. Analysis.—Calc'd for $C_{10}H_{13}O_3ClS$: C, 48.29; H, 5.27; Cl, 14.26; Found: C, 48.76; H, 4.64; Cl, 13.9.

Example 2

In 158.2 gms. of pyridine were suspended 190.6 gms. of p-toluene sulfonyl chloride, and the mixture was cooled to 0° C. To this suspension, 94.6 gms. of propylene chlorohydrin were added slowly, with stirring, keeping the temperature at 0° C. Stirring at 0° C. was continued for 1 hour. The reaction mixture was allowed to stand in an icebox for about 15 hours, and was then stirred at room temperature for about 24 hours.

Pyridine hydrochloride, which had precipitated, was removed by filtration. To the filtrate were added 10 cc. of water, and the solution was allowed to stand for 1 hour. Ether and hydrochloric acid were added and the layers were separated. The ethereal layer was washed successively with hydrochloric acid, water, sodium hydroxide, and water. The ethereal solution was dried and distilled in vacuo. There was obtained 227 gms. (91%) of 1-methyl-2-chloroethyl-p-toluene sulfonate, boiling point 119–120° C./0.5 mm.

Example 3

In 158.2 gms. of pyridine were suspended 176.6 gms. of benzenesulfonyl chloride, and the mixture was cooled to 0° C. To this suspension, 94.6 gms. of propylene chlorohydrin were added slowly, with stirring, keeping the temperature at 0° C. Stirring at 0° C., was continued for 1 hour. The reaction mixture was allowed to stand in an icebox for about 42 hours, and was then stirred at room temperature for about 24 hours.

Pyridine hydrochloride, which had precipitated, was removed by filtration. To the filtrate were added 10 cc. of water, and the solution was allowed to stand 1 hour. Ether and hydrochloric acid were added, and the layers were separated. The ethereal layer was washed successively with hydrochloric acid, water, sodium hydroxide, and water. The ethereal solution was dried and distilled in vacuo. There was obtained 205.5 gms. (87.2%) of 1-methyl-2-chloroethyl-benzenesulfonate, boiling point 105–106° C./0.1 mm. Analysis.—Calc'd for $C_9H_{11}O_3ClS$: C, 45.86; H, 4.71; Cl, 15.04; Found: C, 46.29; H, 4.94; Cl, 14.35.

Example 4

In 79.1 gms. of pyridine were suspended 57.3 gms. of methanesulfonyl chloride, and the mixture was cooled to 0° C. To this suspension, 47.3 gms. of propylene chlorohydrin were added slowly with stirring, keeping the temperature at 0° C. Stirring at 0° C. was continued for 1 hour. The reaction mixture was allowed to stand in an icebox overnight, and was then stirred at room temperature for about 24 hours.

The precipitate of pyridine hydrochloride was removed by filtration. To the filtrate was added 8 cc. of water, and the solution was stirred for 1 hour. Benzene and hydrochloric acid were added and the layers were separated. The benzene layer was washed successively with hydrochloric acid, water and sodium hydroxide and water. The benzene solution was dried and distilled in vacuo. There was obtained 65 gms. (75.5%) of 1-methyl-2-chloroethyl-methanesulfonate, boiling point 76.5–77° C./0.41 mm. Analysis.—Calc'd for $C_4H_9O_3ClS$: C, 27.76; H, 5.26; Cl, 20.54; Found: C, 28.19; H, 5.37; Cl, 20.81.

Example 5

To 35.4 gms. of sodamide under nitrogen, a solution of 175.5 gms. of diphenylacetonitrile in 1200 cc. of toluene was added rapidly. The mixture was heated with stirring to 106° C., and maintained at this temperature for about 3½ hours.

The reaction mixture was then cooled to 70° C., and 227 gms. of 1-methyl-2-chloroethyl-p-toluenesulfonate were added rapidly, keeping the temperature below 90° C. The mixture was then heated at reflux for about 18 hours, cooled to 70° C., and 500 cc. of water were added. The organic layer was separated, washed with water, and dried. It was then distilled in vacuo. There was obtained 140 gms. (57%) of 2,2-diphenyl-3-methyl-4-chloro-butyronitrile, boiling point 154–160° C./0.2 mm. Analysis.—Calc'd for $C_{17}H_{16}NCl$: C, 75.68; H, 5.98; N, 5.19; Found: C, 75.68; H, 5.90; N, 5.33.

Example 6

To 7.9 gms. of sodamide and 100 cc. of toluene, under nitrogen, a solution of 38.6 gms. of diphenylacetonitrile in 300 cc. of toluene was added rapidly. The mixture was heated with stirring to 105° C., and maintained at this temperature for about 3 hours. The reaction mixture was then cooled to 65° C., and 47.2 gms. of 1-methyl-2-chloroethyl-benzenesulfonate were added rapidly, keeping the temperature below 85° C. The mixture was then heated at reflux for about 18 hours, cooled to 70° C. and 500 cc. of water were added. The organic layer was separated, washed with water and dried. It was then distilled in vacuo. There was obtained 37 gms. (69%) of 2,2-diphenyl-3-methyl-4 - chloro-butyronitrile, boiling range 143–150° C./0.17 mm. Analysis.—Calc'd for $C_{17}H_{16}NCl$: C, 75.69; H, 5.98; Found: C, 75.71; H, 6.05.

Example 7

To 13.6 gms. of sodamide under nitrogen, a solution of 57.2 gms. of diphenylacetonitrile in 1200 cc. of toluene was added rapidly. The mixture was heated with stirring to 108° C., and maintained at this temperature for about 5 hours.

The reaction mixture was then cooled to 90° C., and 60 gms. of 1-methyl-2-chloroethyl-methanesulfonate were added rapidly, keeping the temperature below 90° C. The mixture was then heated at reflux for about 14 hours, cooled to room temperature and 500 cc. of water were added. The organic layer was separated, washed with water, and dried. It was then distilled in vacuo. There was obtained 50 gms. (52.7%) of 2,2-diphenyl-3-methyl-4-chloro-butyronitrile, boiling range 116–128° C./0.04 mm. *Analysis.*—Calc'd for $C_{17}H_{16}NCl$: C, 75.68; H, 5.98; N, 5.19; Cl, 13.15; Found: C, 76.06; H, 6.34; N, 4.89; Cl, 12.74.

*Example 8*

In 20 cc. of absolute ethanol were dissolved 5 gms. of 2,2-diphenyl-3-methyl-4-chloro-butyronitrile, and the solution was cooled in a Dry Ice-acetone bath. The cold solution was added to 20 cc. of anhydrous dimethylamine, cooled in a Dry Ice-acetone bath. The mixture was then sealed in a bomb tube and heated overnight at 100° C.

The contents of the tube were concentrated to dryness in vacuo, and to the residue was added ether and water. The layers were separated, and the ether layer was extracted with hydrochloric acid. The acid extracts were made alkaline with sodium hydroxide, and were then extracted with ether. The ethereal extracts were dried and concentrated to dryness in vacuo. The residue crystallized on cooling and scratching.

The residue was dissolved in ether and saturated with dry HCl gas. 2,2-diphenyl-3-methyl-4-dimethylamino-butyronitrile hydrochloride precipitated, was removed by filtration, and was recrystallized from absolute ethanol, M. P. 218–220° C. The mixed melting point with an authentic sample of the nitrile hydrochloride was 218–220° C. Comparison of the product with an authentic sample of the nitrile hydrochloride by means of infra-red spectra showed the two compounds to be identical. *Analysis.*—Calc'd for $C_{19}H_{23}N_2Cl$: C, 72.48; H, 7.36; N, 8.90; Found: C, 72.34; H, 7.24; N, 9.09.

*Example 9*

To 20 cc. of anhydrous dimethylamine cooled in a Dry Ice-acetone bath were added 20 gms. of 2,2-diphenyl-3-methyl-4-chloro-butyronitrile. The mixture was sealed in a bomb tube and heated at 150° C. for 48 hours.

Ether and water were added to the reaction mixture, and the two layers formed were separated. The ethereal layer was extracted with hydrochloric acid. The acid extracts were neutralized with sodium hydroxide and extracted with ether. The ether extracts were concentrated to dryness in vacuo. There was obtained a residue of 9.8 gms. (47.5%) of 2,2-diphenyl-3-methyl-4-dimethylamino-butyronitrile. This can be purified, if desired, as outlined in Example 8.

Various changes and modifications may be made in our invention without departing from the spirit and scope thereof. Insofar as these changes and modifications are within the purview of the annexed claims, they are to be considered as part of our invention.

We claim:

1. The process which comprises reacting an organic sulfonate of propylene chlorohydrin with the condensation product of diphenylacetonitrile and sodamide.

2. The process of preparing 2,2-diphenyl-3-methyl-4-chloro-butyronitrile which comprises reacting diphenylacetonitrile with sodamide in the presence of a liquid hydrocarbon, and treating the condensation product with an organic sulfonate of the formula:

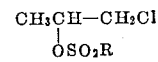

wherein R is a radical selected from the class which consists of alkyl, aryl, aralkyl and alkaryl radicals.

3. The process of preparing 2,2-diphenyl-3-methyl-4-chloro-butyronitrile which comprises reacting diphenylacetonitrile with sodamide in the presence of a liquid hydrocarbon, and heating the reaction product with 1-methyl-2-chloroethyl p-toluene sulfonate.

4. The process of preparing 2,2-diphenyl-3-methyl-4-chloro-butyronitrile which comprises reacting diphenylacetonitrile with sodamide in the presence of a liquid hydrocarbon, and heating the reaction product with 1-methyl-2-chloroethyl benzene sulfonate.

5. The process of preparing 2,2-diphenyl-3-methyl-4-chloro-butyronitrile which comprises reacting diphenylacetonitrile with sodamide in the presence of a liquid hydrocarbon, and heating the reaction product with 1-methyl-2-chloroethyl methane sulfonate.

6. 2,2-diphenyl-3-methyl-4-chloro-butyronitrile.

EARL M. CHAMBERLIN.
MAX TISHLER.

References Cited in the file of this patent

FOREIGN PATENTS

| Number | Country | Date |
|---|---|---|
| 563,665 | Great Britain | Aug. 24, 1944 |

OTHER REFERENCES

Dupre et al., J. Chem. Soc., 1949, pp. 500–518.